(No Model.)

A. M. GARMAN.
WAGON BRAKE.

No. 321,709. Patented July 7, 1885.

WITNESSES:
W. W. Hollingsworth
Solon C. Kemon

INVENTOR:
Adam M. Garman
BY Munn & Co
ATTORNEYS.

UNITED STATES PATENT OFFICE.

ADAM MILLER GARMAN, OF SINKING CREEK, VIRGINIA, ASSIGNOR TO HIMSELF AND WILLIAM JACKSON GARMAN, OF SAME PLACE.

WAGON-BRAKE.

SPECIFICATION forming part of Letters Patent No. 321,709, dated July 7, 1885.

Application filed March 10, 1885. (No model.)

*To all whom it may concern:*

Be it known that I, ADAM MILLER GARMAN, a citizen of the United States, residing at Sinking Creek, in the county of Craig and State of Virginia, have invented certain new and useful Improvements in Vehicle-Locks, of which the following is a description.

Figure 1:
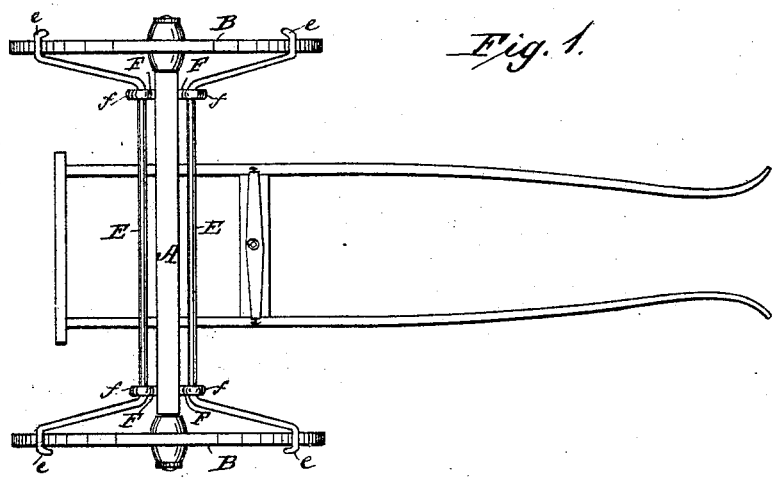
Figure 2:
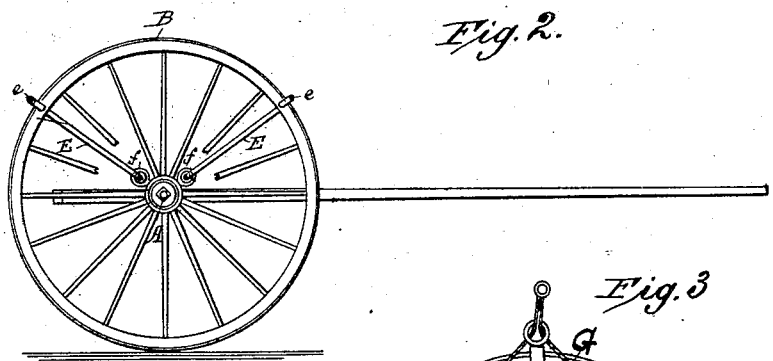
Figure 3:
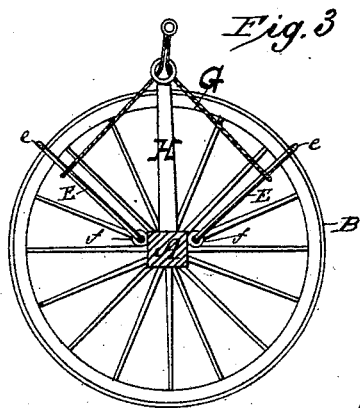

Figure 1 is a plan view of a vehicle with the locking apparatus applied to the wheels. Fig. 2 is a side view of the same. Fig. 3 is a transverse section thereof.

My invention relates to apparatus used for locking or scotching the wheels of vehicles, and thereby preventing them from turning.

The invention consists of the combination of parts and their construction, substantially as hereinafter fully set forth.

In the accompanying drawings similar letters of reference indicate corresponding parts in all the figures.

A is the axle of the vehicle, upon the ends of which the wheels B revolve. E are bent rods, having the hooks $e$ formed on their outer extremities, and adapted to engage with the wheels B. F are bolts rigidly attached to the axle A of the vehicle, and provided with the eyes $f$, in which the rods E are pivoted.

The rod E in front of the axle prevents the forward motion of the vehicle, as any attempt to move it in that direction while its hooks are resting upon the tires of the wheel will cause them to grip the said tires tightly and lock the wheels to the axle. The rod E at the rear of the axle in a similar manner prevents the vehicle from being moved in a backward direction.

G is a cord or chain with its ends connected one to each rod E and with its looped portion passed through an aperture in one of the standards H, by pulling upon which looped portion of said cord or chain the said rods can be lifted so as to disengage their hooks $e$ from the wheels B, and thus permit the release or turning of the wheels when it is desired to take off the brakes.

Instead of attaching the bolts F to the axle, they may be attached to any convenient part of the framing of the vehicle which does not revolve with the wheels.

My invention is equally applicable and can be attached to wagons, buggies, phaetons, drags, street-cars, steam-cars, and to all vehicles running upon wheels.

Having thus described my invention, what I claim as new, and desire to secure by Letters Patent, is—

The combination, with the axle and an upright thereon, of the bent rods pivoted to said axle, and having hooks at their ends to bear upon or hug the wheel-tires, and the rod-operating chain or cord with its ends connected to said rods, said cord or chain also being looped through a ring or aperture of said upright, substantially as and for the purpose set forth.

ADAM MILLER GARMAN.

Witnesses:
PETER G. McGUIRE,
IRA A. PECK.